(12) United States Patent
Takane et al.

(10) Patent No.: US 11,746,303 B2
(45) Date of Patent: Sep. 5, 2023

(54) GREASE COMPOSITION

(71) Applicant: IDEMITSU KOSAN CO., LTD., Chiyoda-ku (JP)

(72) Inventors: Kouji Takane, Chiba (JP); Go Watanabe, Chiba (JP); Akihiro Shishikura, Chiba (JP); Jun Yamashita, Funabashi (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/423,252

(22) PCT Filed: Jan. 31, 2020

(86) PCT No.: PCT/JP2020/003580
§ 371 (c)(1),
(2) Date: Jul. 15, 2021

(87) PCT Pub. No.: WO2020/158907
PCT Pub. Date: Aug. 6, 2020

(65) Prior Publication Data
US 2022/0073837 A1 Mar. 10, 2022

(30) Foreign Application Priority Data
Jan. 31, 2019 (JP) ................ 2019-016162

(51) Int. Cl.
*C10M 169/00* (2006.01)
*F16C 33/10* (2006.01)
(Continued)

(52) U.S. Cl.
CPC ........ *C10M 169/00* (2013.01); *C10M 101/02* (2013.01); *C10M 107/02* (2013.01);
(Continued)

(58) Field of Classification Search
CPC . F16C 33/102; F16C 33/6633; C10M 169/00; C10M 115/08; C10M 141/06;
(Continued)

(56) References Cited

U.S. PATENT DOCUMENTS 10,150,929 B2 * 12/2018 Suetsugu ............. C10M 177/00
11,198,834 B2 * 12/2021 Sekiguchi ............ C10M 169/02
(Continued)

FOREIGN PATENT DOCUMENTS

| CN | 101107347 A | 1/2008 |
|---|---|---|
| JP | 2006-214516 A | 8/2006 |

(Continued)

OTHER PUBLICATIONS

International Search Report dated Apr. 14, 2020 in PCT/JP2020/003580 filed on Jan. 31, 2020, 3 pages.
(Continued)

*Primary Examiner* — Ellen M McAvoy
(74) *Attorney, Agent, or Firm* — Oblon, McClelland, Maier & Neustadt, L.L.P.

(57) ABSTRACT

The present invention relates to a grease composition which can impart excellent durability to a bearing used under a high-speed rotation condition with a DN value of 100,000 or more, wherein the grease composition contains a base oil (A) and a urea-based thickener (B), and particles containing the urea-based thickener (B) in the grease composition satisfy requirement (I) that the particles have an arithmetic mean particle diameter of 2.0 μm or less on an area basis when measured by a laser diffraction scattering method. The grease composition is used for a bearing used under a high-speed rotation condition with a DN value of 100,000 or more.

11 Claims, 4 Drawing Sheets

(51) Int. Cl.
*C10M 101/02* (2006.01)
*C10M 107/02* (2006.01)
*C10M 115/08* (2006.01)
*C10M 129/74* (2006.01)
*C10M 133/12* (2006.01)
*C10M 141/06* (2006.01)
*C10N 20/06* (2006.01)
*C10N 30/02* (2006.01)
*C10N 30/10* (2006.01)
*C10N 30/12* (2006.01)
*C10N 40/02* (2006.01)
*C10N 50/10* (2006.01)

(52) U.S. Cl.
CPC ........ *C10M 115/08* (2013.01); *C10M 129/74* (2013.01); *C10M 133/12* (2013.01); *C10M 141/06* (2013.01); *F16C 33/102* (2013.01); *C10M 2203/003* (2013.01); *C10M 2205/0206* (2013.01); *C10M 2207/283* (2013.01); *C10M 2215/1026* (2013.01); *C10M 2215/26* (2013.01); *C10N 2020/06* (2013.01); *C10N 2030/02* (2013.01); *C10N 2030/10* (2013.01); *C10N 2030/12* (2013.01); *C10N 2040/02* (2013.01); *C10N 2050/10* (2013.01)

(58) Field of Classification Search
CPC ....... C10M 2215/1026; C10N 2040/02; C10N 2050/10; C10N 2020/06
See application file for complete search history.

(56) References Cited

U.S. PATENT DOCUMENTS

| | | | |
|---|---|---|---|
| 2004/0224859 A1 | 11/2004 | Numazawa et al. | |
| 2007/0154128 A1* | 7/2007 | Mikami | C10M 125/00 384/627 |
| 2008/0196995 A1* | 8/2008 | Mikami | F16D 41/06 384/607 |
| 2011/0294705 A1* | 12/2011 | Ikuma | C10M 169/02 508/136 |
| 2013/0123153 A1* | 5/2013 | Kimura | C10M 169/06 508/154 |
| 2013/0137612 A1* | 5/2013 | Iwamatsu | C10M 125/22 508/167 |
| 2017/0029735 A1* | 2/2017 | Suetsugu | C10M 177/00 |
| 2017/0158980 A1* | 6/2017 | Ekman | C10M 125/04 |
| 2018/0037842 A1 | 2/2018 | Suetsugu et al. | |
| 2018/0079983 A1* | 3/2018 | Nakanishi | C10M 175/0083 |
| 2018/0216026 A1 | 8/2018 | Asai | |
| 2020/0048574 A1* | 2/2020 | Sekiguchi | C10M 169/02 |
| 2021/0317877 A1* | 10/2021 | Nakanishi | F16C 23/086 |
| 2021/0324290 A1* | 10/2021 | Koga | C10M 115/08 |

FOREIGN PATENT DOCUMENTS

| | | |
|---|---|---|
| JP | 2009-293042 A | 12/2009 |
| JP | 2012-229334 A | 11/2012 |
| JP | 2016-145292 A | 8/2016 |
| JP | 2016-204623 A | 12/2016 |
| JP | 2017-115109 A | 6/2017 |
| JP | 2018-119090 A | 8/2018 |
| WO | WO 2016/125859 A1 | 8/2016 |
| WO | WO 2019/151332 A1 | 8/2019 |

OTHER PUBLICATIONS

Combined Chinese Office Action and Search Report dated May 5, 2022 in Chinese Patent Application No. 202080011236.9 (with unedited computer generated English translation), 17 pages.
Extended European Search Report dated Oct. 12, 2022 in the corresponding European patent application 20749088.9 filed on Jan. 31, 2020 (total 6 pages).

* cited by examiner

GREASE COMPOSITION

TECHNICAL FIELD

The present invention relates to a grease composition.

BACKGROUND ART

Grease is a semi-solid lubricant containing a base oil and a thickener. For example, a grease using lithium soap as a thickener (hereinafter, also referred to as "lithium soap grease") is widely used for bearings of automobiles, machine tools, and construction machines. In addition, as a grease having a long lubricating life at high temperatures and excellent oxidation stability, heat resistance, and water resistance, a grease using a urea-based thickener (hereinafter, also referred to as "urea grease") is also known (for example, see PTL 1).

CITATION LIST

Patent Literature

[PTL 1] JP 2009-293042 A

SUMMARY OF INVENTION

Technical Problem

In recent years, as electric vehicles, hybrid vehicles, and plug-in hybrid vehicles have become more widespread, the output of the drive motor used in these vehicles has been increasing rapidly. As the output of the drive motor increases, the bearing included in the drive motor rotates at a higher speed than the bearing included in the conventional drive motor, and thus heat is easily generated. Under such a condition that the temperature tends to be high, it is considered to use urea grease having higher heat resistance than lithium soap grease.

However, the conventional urea grease is liable to cause oil film shortage under the high-speed rotation condition as described above, and seizure occurs in the bearing at an early stage. Therefore, sufficient durability cannot be imparted to the bearing, and there is room for improvement.

An object of the present invention is to provide a grease composition capable of imparting excellent durability to a bearing used under a high-speed rotation condition having a DN value of 100,000 or more.

The "DN value" means the product of D and N when the inner diameter of the bearing is D (unit: mm) and the rotational speed of the bearing is N (rpm).

Solution to Problem

In a grease composition containing a base oil and a urea-based thickener, the present inventors focused on the particle diameter of the particles containing the urea-based thickener in the grease composition.

Then, the present inventors have found that the above-described problems can be solved by a grease composition in which the arithmetic mean particle diameter on an area basis when the particles are measured by a laser diffraction scattering method is adjusted to a predetermined range, and have completed the present invention.

Specifically, the present invention relates to the following [1] to [11].

[1] A grease composition containing a base oil (A) and a urea-based thickener (B), wherein particles containing the urea-based thickener (B) in the grease composition satisfy the following requirement (I), and the grease composition is used for a bearing used under a high-speed rotation condition with a DN value of 100,000 or more:

Requirement (I): the particles have an arithmetic mean particle diameter of 2.0 μm or less on an area basis when measured by a laser diffraction scattering method.

[2] The grease composition as set forth in [1], wherein the particles containing the urea-based thickener (B) in the grease composition further satisfy the following requirement (II):

Requirement (II): the specific surface area of the particles, as measured by a laser diffraction scattering method, is 20,000 cm$^2$/cm$^3$ or more.

[3] The grease composition as set forth in [1] or [2], wherein the base oil (A) is one or more selected from a mineral oil, a hydrocarbon-based oil, an aromatic-based oil, an ester-based oil, and an ether-based oil.

[4] The grease composition as set forth in any of [1] to [3], wherein the base oil (A) has a kinematic viscosity at 40° C. of 10 to 300 mm$^2$/s.

[5] The grease composition as set forth in any of [1] to [4], wherein the content of the urea-based thickener (B) is 1 to 40% by mass based on the whole amount of the grease composition.

[6] The grease composition as set forth in any of [1] to [5], wherein the urea-based thickener (B) is one or more selected from a diurea compound represented by the following general formula (b1):

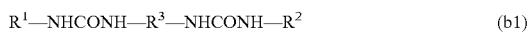

$$R^1\text{—NHCONH—}R^3\text{—NHCONH—}R^2 \quad (b1)$$

wherein $R^1$ and $R^2$ each independently represent a monovalent hydrocarbon group having 6 to 24 carbon atoms, and $R^1$ and $R^2$ may be the same as or different from each other, and $R^3$ represents a divalent aromatic hydrocarbon group having 6 to 18 carbon atoms.

[7] The grease composition as set forth in any of [1] to [6], further containing one or more additives (C) selected from an antioxidant, a rust inhibitor, a dispersant, an extreme pressure agent, and a metal deactivator.

[8] The grease composition as set forth in [7], wherein the content of the additive (C) is 0.01 to 20% by mass based on the whole amount of the grease composition.

[9] The grease composition as set forth in any of [1] to [8], wherein the grease composition is used for a bearing of a drive motor for an electric vehicle, a hybrid vehicle, and a plug-in hybrid vehicle, the bearing being used under a high-speed rotation condition with a DN value of 100,000 or more.

[10] A bearing lubricated by the grease composition as set forth in any of [1] to [9] and used under a high-speed rotation condition with a DN value of 100,000 or more.

[11] A lubricating method including lubricating a bearing used under a high-speed rotation condition with a DN value of 100,000 or more by the grease composition as set forth in any of [1] to [9].

Advantageous Effects of Invention

According to the present invention, it is possible to provide a grease composition capable of imparting excellent durability to a bearing used under a high-speed rotation condition with a DN value of 100,000 or more.

DESCRIPTION OF EMBODIMENTS

[Grease Composition]

Figure 1:
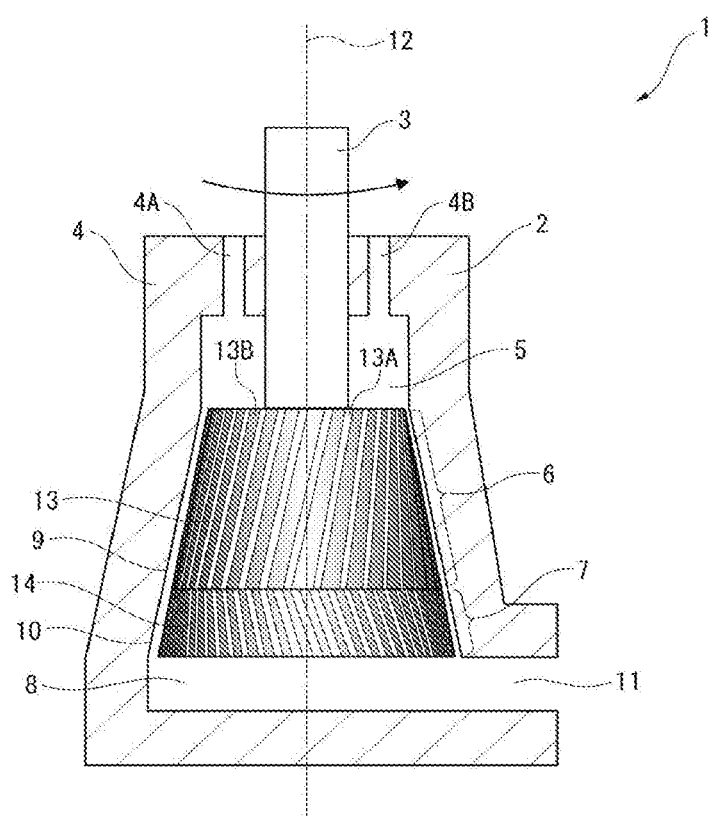
FIG. 1 is a schematic cross-sectional view of a grease manufacturing apparatus used in one embodiment of the present invention.

The grease composition of the present invention contains a base oil (A) and a urea-based thickener (B).

In the following description, "base oil (A)" and "urea-based thickener (B)" are also referred to as "component (A)" and "component (B)", respectively.

In the grease composition of one embodiment of the present invention, the total content of the components (A) and (B) is preferably 60% by mass or more, more preferably 70 to 100% by mass, still more preferably 80 to 100% by mass, and even still more preferably 90 to 100% by mass, based on the whole amount (100% by mass) of the grease composition.

The grease composition according to one embodiment of the present invention may contain components other than the components (A) and (B) as long as the effects of the present invention are not impaired.

In addition, in the grease composition of the present invention, the particles containing the urea-based thickener (B) in the grease composition satisfy the following requirement (I).

Requirement (I):

The particles have an arithmetic mean particle diameter of 2.0 μm or less on an area basis when measured by a laser diffraction scattering method.

By satisfying the requirement (I), the grease composition can impart excellent durability to a bearing used under a high-speed rotation condition with a DN value of 100,000 or more.

The above requirement (I) can also be regarded as a parameter indicating the state of aggregation of the urea-based thickener (B) in the grease composition.

Here, the "particles containing the urea-based thickener (B)" to be measured by the laser diffraction scattering method refers to particles formed by aggregation of the urea-based thickener (B) contained in the grease composition.

When an additive other than the urea-based thickener (B) is contained in the grease composition, the particle diameter defined by the requirement (I) is obtained by measuring a grease composition prepared under the same conditions without blending the additive by a laser diffraction scattering method. However, when the additive is liquid at room temperature (25° C.), a grease composition containing the additive may be used as the measurement target.

The urea-based thickener (B) is usually obtained by reacting an isocyanate compound with a monoamine. However, since the reaction rate is very high, the urea-based thickener (B) is likely to aggregate, and large particles (micelle particles, so-called "lumps") are likely to be excessively generated. As a result of intensive studies by the present inventors, it has been found that it is difficult to impart excellent durability to a bearing used under a high-speed rotation condition with a DN value of 100,000 or more when the particle diameter defined by the requirement (I) exceeds 2.0 μm.

When the particle diameter defined by the requirement (I) is micronized to 2.0 μm or less, the holding power of the base oil (A) by the particles is improved, and the fluidity of the grease composition itself is also improved. Therefore, even under conditions where the bearing rotates at high speed, the particles retain the base oil (A) well, and the grease composition is well distributed to the portion that requires lubrication, which is expected to be capable of imparting excellent durability to the bearing used under a high-speed rotation condition with a DN value of 100,000 or more.

From the above viewpoint, in the grease composition of one embodiment of the present invention, the particle diameter defined by the above requirement (I) is preferably 1.5 μm or less, more preferably 1.0 μm or less, still more preferably 0.9 μm or less, even still more preferably 0.8 μm or less, yet more preferably 0.7 μm or less, and yet even more preferably 0.6 μm or less. It is usually 0.01 μm or more.

Here, it is preferable that the grease composition of one embodiment of the present invention further satisfies the following requirement (II).

Requirement (II):

The specific surface area of the particles, as measured by a laser diffraction scattering method, is 20,000 $cm^2/cm^3$ or more.

The specific surface area defined by the requirement (II) is a secondary indicator showing the state of micronization of the particles containing the urea-based thickener (B) in the grease composition and the presence of large particles (lumps). That is, by satisfying the above requirement (I) and further satisfying the above requirement (II), the state of micronization of the particles containing the urea-based thickener (B) in the grease composition is better, and the presence of large particles (lumps) is also suppressed. Therefore, excellent durability is more easily imparted to a bearing used under a high-speed rotation condition with a DN value of 100,000 or more.

From the above viewpoint, the specific surface area defined by the above requirement (II) is preferably 50,000 $cm^2/cm^3$ or more, more preferably 100,000 $cm^2/cm^3$ or more, and still more preferably 200,000 $cm^2/cm^3$ or more.

In the description herein, the values defined by the requirement (I) and further by the requirement (II) are values measured by the methods described in Examples below.

The values defined by the requirement (I) and further by the requirement (II) can be adjusted mainly by the production conditions of the urea-based thickener (B).

Hereinafter, each component contained in the grease composition of the present invention will be described in detail while paying attention to specific means for adjusting the values defined by the requirement (I) and further by the requirement (II).

<Base Oil (A)>

The base oil (A) contained in the grease composition of the present invention may be a base oil generally used in grease compositions, and examples thereof include one or more selected from a mineral oil and a synthetic oil.

Examples of the mineral oil include a distillate oil obtained by atmospheric distillation or vacuum distillation of paraffin crude oil, intermediate base crude oil, or naphthenic crude oil, and a refined oil obtained by refining these distillate oils.

Examples of the purification method for obtaining a refined oil include a hydroreforming treatment, a solvent extraction treatment, a solvent dewaxing treatment, a hydroisomerization dewaxing treatment, a hydrofinishing treatment, and a clay treatment.

Examples of the synthetic oil include a hydrocarbon-based oil, an aromatic-based oil, an ester-based oil, and an ether-based oil. In addition, a synthetic oil obtained by isomerizing a wax (GTL wax) produced by the Fischer-Tropsch process or the like is also included.

Examples of the hydrocarbon-based oil include a poly-α-olefin (PAO), such as normal paraffin, isoparaffin, polybutene, polyisobutylene, a 1-decene oligomer, and a cooligomer of 1-decene and ethylene oligomer; and a hydrogenated product thereof.

Examples of the aromatic-based oil include an alkylbenzene, such as a monoalkylbenzene and a dialkylbenzene; and an alkylnaphthalene, such as a monoalkylnaphthalene, a dialkylnaphthalene, and a polyalkylnaphthalene.

Examples of the ester-based oil include a diester-based oil, such as dibutyl sebacate, di-2-ethylhexyl sebacate, dioctyl adipate, diisodecyl adipate, ditridecyl adipate, ditridecyl glutarate, and methyl acetyl ricinolate; an aromatic ester-based oil, such as trioctyl trimellitate, tridecyl trimellitate, and tetraoctyl pyromellitate; a polyol ester-based oil, such as trimethylolpropane caprylate, trimethylolpropane pelargonate, pentaerythritol-2-ethylhexanoate, and pentaerythritol pelargonate; and a complex ester-based oil, such as an oligoester of a polyhydric alcohol with a mixed fatty acid of a dibasic acid and a monobasic acid.

Examples of the ether-based oil include a polyglycol, such as polyethylene glycol, polypropylene glycol, polyethylene glycol monoether, and polypropylene glycol monoether; and a phenyl ether-based oil, such as a monoalkyl triphenyl ether, an alkyl diphenyl ether, a dialkyl diphenyl ether, pentaphenyl ether, tetraphenyl ether, a monoalkyl tetraphenyl ether, and a dialkyl tetraphenyl ether.

When oxidation stability at high temperatures is required, the base oil (A) is preferably a synthetic oil, more preferably a hydrocarbon-based oil, an ester-based oil, or an ether-based oil. In addition, by using a mixture of a hydrocarbon-based oil, an ester-based oil, and an ether-based oil, it is possible to balance heat resistance, sealing resistance, and low-temperature characteristics.

The kinematic viscosity at 40° C. of the base oil (A) used in one embodiment of the present invention is preferably 10 to 300 mm$^2$/s, more preferably 15 to 200 mm$^2$/s, and still more preferably 20 to 150 mm$^2$/s.

The base oil (A) used in one embodiment of the present invention may be a mixed base oil having a kinematic viscosity adjusted within the above range by combining a base oil having a high viscosity and a base oil having a low viscosity.

The viscosity index of the base oil (A) used in one embodiment of the present invention is preferably 60 or more, more preferably 70 or more, and still more preferably 80 or more.

In the description herein, the kinematic viscosity and the viscosity index mean values measured or calculated in conformity with JIS K2283:2000.

In the grease composition according to one embodiment of the present invention, the content of the base oil (A) is preferably 50% by mass or more, more preferably 55% by mass or more, still more preferably 60% by mass or more, and even still more preferably 65% by mass or more, and preferably 98.5% by mass or less, more preferably 97% by mass or less, still more preferably 95% by mass or less, and even still more preferably 93% by mass or less, based on the whole amount (100% by mass) of the grease composition.

<Urea-based Thickener (B)>

The urea-based thickener (B) contained in the grease composition of the present invention may be a compound having a urea bond, but is preferably a diurea compound having two urea bonds, and more preferably a diurea compound represented by the following general formula (b1).

$$R^1\text{—NHCONH—}R^3\text{—NHCONH—}R^2 \qquad (b1)$$

The urea-based thickener (B) used in one embodiment of the present invention may be composed of one type or may be a mixture of two or more types.

In the general formula (b1), $R^1$ and $R^2$ each independently represent a monovalent hydrocarbon group having 6 to 24 carbon atoms. $R^1$ and $R^2$ may be the same or different from each other. $R^3$ represents a divalent aromatic hydrocarbon group having 6 to 18 carbon atoms.

Although the carbon number of the monovalent hydrocarbon group which can be selected as $R^1$ and $R^2$ in the general formula (b1) is 6 to 24, it is preferably 6 to 20, and more preferably 6 to 18.

Examples of the monovalent hydrocarbon group which can be selected as $R^1$ and $R^2$ include a saturated or unsaturated monovalent chain hydrocarbon group, a saturated or unsaturated monovalent alicyclic hydrocarbon group, and a monovalent aromatic hydrocarbon group.

Here, in $R^1$ and $R^2$ in the general formula (b1), when the content of the chain hydrocarbon group is designated as an X molar equivalent, the content of the alicyclic hydrocarbon group is designated as a Y molar equivalent, and the content of the aromatic hydrocarbon group is designated as a Z molar equivalent, it is preferred that the following requirements (a) and (b) are satisfied.

Requirement (a):

A value of $\{[(X+Y)/(X+Y+Z)]\times100\}$ is 90 or more (preferably 95 or more, more preferably 98 or more, and still more preferably 100).

Requirement (b):

An X/Y ratio is 0 to 100 (preferably 10/90 to 90/10, more preferably 20/80 to 85/15, and still more preferably 40/60 to 85/15).

In view of the fact that the aforementioned alicyclic hydrocarbon group, the aforementioned chain hydrocarbon group, and the aforementioned aromatic hydrocarbon are each a group to be selected as $R^1$ and $R^2$ in the general formula (b1), the sum total of the X, Y, and Z values is 2 molar equivalents per mol of the compound represented by the general formula (b1). In addition, the values of the requirements (a) and (b) each mean an average value of the total amount of the group of the compounds represented by the general formula (b1), which are contained in the grease composition.

By using the compound represented by the general formula (b1) that satisfies the requirements (a) and (b), the lubricating life and lubricating performance of the grease composition are both achieved, and excellent durability is easily imparted to a bearing used under a high-speed rotation condition with a DN value of 100,000 or more.

The X, Y, and Z values can be calculated from a molar equivalent of each amine to be used as a raw material.

Examples of the monovalent saturated chain hydrocarbon group include a linear or branched alkyl group having 6 to 24 carbon atoms, and specific examples thereof include a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. Among these, a linear or branched alkyl group having 10 to 20 carbon atoms is preferable, and a linear or branched alkyl group having 16 to 20 carbon atoms is more preferable. The alkyl group is preferably a linear chain.

Examples of the monovalent unsaturated chain hydrocarbon group include a linear or branched alkenyl group having 6 to 24 carbon atoms, and specific examples thereof include a hexenyl group, a heptenyl group, an octenyl group, a nonenyl group, a decenyl group, a dodecenyl group, a tridecenyl group, a tetradecenyl group, a pentadecenyl group, a hexadecenyl group, an octadecenyl group, a nonadecenyl group, an icosenyl group, an oleyl group, a geranyl group, a farnesyl group, and a linoleyl group.

The monovalent saturated chain hydrocarbon group and the monovalent unsaturated chain hydrocarbon group each may be a linear chain or a branched chain. Among these, a linear or branched alkenyl group having 10 to 20 carbon atoms is preferable, and a linear or branched alkenyl group having 16 to 20 carbon atoms is more preferable. The alkenyl group is preferably a linear chain.

Examples of the monovalent saturated alicyclic hydrocarbon group include a cycloalkyl group, such as a cyclohexyl group, a cycloheptyl group, a cyclooctyl group, and a cyclononyl group; and a cycloalkyl group substituted with an alkyl group having 1 to 6 carbon atoms (preferably a cyclohexyl group substituted with an alkyl group having 1 to 6 carbon atoms), such as a methylcyclohexyl group, a dimethylcyclohexyl group, an ethylcyclohexyl group, a diethylcyclohexyl group, a propylcyclohexyl group, an isopropylcyclohexyl group, a 1-methyl-propylcyclohexyl group, a butylcyclohexyl group, a pentylcyclohexyl group, a pentyl-methylcyclohexyl group, and a hexylcyclohexyl group. Among these, a cycloalkyl group having 5 to 8 carbon atoms is preferable, and a cyclohexyl group is more preferable.

Examples of the monovalent unsaturated alicyclic hydrocarbon group include a cycloalkenyl group, such as a cyclohexenyl group, a cycloheptenyl group, and a cyclooctenyl group; and a cycloalkenyl group substituted with an alkyl group having 1 to 6 carbon atoms (preferably a cyclohexenyl group substituted with an alkyl group having 1 to 6 carbon atoms), such as a methylcyclohexenyl group, a dimethylcyclohexenyl group, an ethylcyclohexenyl group, a diethylcyclohexenyl group, and a propylcyclohexenyl group.

Examples of the monovalent aromatic hydrocarbon group include a phenyl group, a biphenyl group, a terphenyl group, a naphthyl group, a diphenylmethyl group, a diphenylethyl group, a diphenylpropyl group, a methylphenyl group, a dimethylphenyl group, an ethylphenyl group, and a propylphenyl group.

Although the carbon number of the divalent aromatic hydrocarbon group which can be selected as $R^3$ in the general formula (b1) is 6 to 18, it is preferably 6 to 15, and more preferably 6 to 13.

Examples of the divalent aromatic hydrocarbon group which can be selected as $R^3$ include a phenylene group, a diphenylmethylene group, a diphenylethylene group, a diphenylpropylene group, a methylphenylene group, a dimethylphenylene group, and an ethylphenylene group.

Among them, a phenylene group, a diphenylmethylene group, a diphenylethylene group, or a diphenylpropylene group is preferable, and a diphenylmethylene group is more preferable.

In the grease composition according to one embodiment of the present invention, the content of component (B) is preferably 1 to 40% by mass, more preferably 2 to 30% by mass, still more preferably 4 to 25% by mass, even still more preferably 6 to 20% by mass, and yet more preferably 9 to 18% by mass, based on the whole amount (100% by mass) of the grease composition. If the amount of the thickener is too large, the composition becomes hard and the lubricity becomes poor. On the other hand, if the amount of the thickener is too small, a problem of leakage during high-speed rotation may occur.

When the content of component (B) is 1% by mass or more, it is easy to adjust the worked penetration of the resulting grease composition to a suitable range.

On the other hand, when the content of the component (B) is 40% by mass or less, the obtained grease composition does not become too hard, and excellent durability is easily imparted to a bearing used under a high-speed rotation condition with a DN value of 100,000 or more.

<Method for Producing Urea-Based Thickener (B)>

The urea-based thickener (B) can be usually obtained by reacting an isocyanate compound with a monoamine. The reaction is preferably performed by adding a solution ß obtained by dissolving a monoamine in the base oil (A) to a heated solution α obtained by dissolving the isocyanate compound in the base oil (A).

For example, when a compound represented by the general formula (b1) is synthesized, a diisocyanate having a group corresponding to a divalent aromatic hydrocarbon group represented by $R^3$ in the general formula (b1) is used as an isocyanate compound, and an amine having a group corresponding to a monovalent hydrocarbon group represented by $R^1$ and $R^2$ is used as a monoamine, and a desired urea-based thickener (B) can be synthesized according to the above-described method.

From the viewpoint of micronizing the urea-based thickener (B) in the grease composition so as to satisfy the above requirement (I) and further the above requirement (II), it is preferable to produce the grease composition containing the component (A) and the component (B) using a grease manufacturing apparatus as shown in the following [1].

[1] A grease manufacturing apparatus including a container body having an introduction portion into which a grease raw material is introduced and a discharge portion for discharging the grease into the outside; and a rotor having a rotation axis in an axial direction of the inner periphery of the container body and rotatably provided in the inside of the container body, the rotor including a first concave-convex portion in which (i) concave and convex are alternately provided along the surface of the rotor, the concave and convex being inclined to the rotation axis, and (ii) a feeding ability from the introduction portion to a direction of the discharge portion is provided.

The grease manufacturing apparatus described in [1] above will be described below, but the provisions described below as "preferred" are the embodiment from the viewpoint of micronizing the urea-based thickener (B) in the grease composition so as to satisfy the above requirement (I) and further the above requirement (II) unless otherwise specified.

FIG. 1 is a schematic cross-sectional view of the grease manufacturing apparatus according to [1] that can be used in one embodiment of the present invention.

A grease manufacturing apparatus 1 shown in FIG. 1 includes a container body 2 for introducing a grease raw material into the inside thereof, and a rotor 3 having a rotation axis 12 on a central axis line of an inner periphery of the container body 2 and rotating around the rotation axis 12 as a center axis.

The rotor 3 rotates at high speed around the rotation axis 12 as a center axis to apply a high shearing force to a grease raw material inside the container body 2. Thus, the grease containing the urea-based thickener is produced.

As shown in FIG. 1, the container body 2 is preferably partitioned to an introduction portion 4, a retention portion 5, a first inner peripheral surface 6, a second inner peripheral surface 7, and a discharge portion 8 in this order from an upstream side.

As shown in FIG. 1, it is preferred that the container body 2 has an inner peripheral surface forming such a truncated cone shape that an inner diameter thereof gradually increases from the introduction portion 4 toward the discharge portion 8.

The introduction portion 4 serving as one end of the container body 2 is provided with a plurality of solution introducing pipes 4A and 4B for introducing a grease raw material from the outside of the container body 2.

The retention portion 5 is disposed in a downstream portion of the introduction portion 4, and is a space for temporarily retaining the grease raw material introduced from the introduction portion 4. When the grease raw material is retained in the retention portion 5 for a long time, grease adhered to the inner peripheral surface of the retention portion 5 forms a large lump, so that it is preferred to transport the grease raw material to the first inner peripheral surface 6 in the downstream side in a short time as far as possible. More preferably, it is preferred to transport the grease raw material directly to the first inner peripheral surface 6 without passing through the retention portion 5.

The first inner peripheral surface 6 is disposed in a downstream portion adjacent to the retention portion 5, and the second inner peripheral surface 7 is disposed in a downstream portion adjacent to the first inner peripheral surface 6. As mentioned later in detail, it is preferred to provide a first concave-convex portion 9 on the first inner peripheral surface 6 and to provide a second concave-convex portion 10 on the second inner peripheral surface 7, for the purpose of allowing the first inner peripheral surface 6 and the second inner peripheral surface 7 to function as a high shearing portion for imparting a high shearing force to the grease raw material or grease.

The discharge portion 8 serving as the other end of the container body 2 is a part for discharging the grease agitated on the first inner peripheral surface 6 and the second inner peripheral surface 7, and is provided with a discharge port 11 for discharging grease. The discharge port 11 is formed in a direction orthogonal or approximately orthogonal to the rotation axis 12. According to this, the grease is discharged from the discharge port 11 to the direction orthogonal or approximately orthogonal to the rotation axis 12. However, the discharge port 11 does not necessarily have to be made orthogonal to the rotation axis 12, and may be formed in a direction parallel or approximately parallel to the rotation axis 12.

The rotor 3 is rotatably provided on the center axis line of the inner peripheral surface of the container body 2, which has a truncated cone shape, as a rotation axis 12, and rotates counterclockwise when the container body 2 is viewed from the upstream portion to the downstream portion as shown in FIG. 1.

The rotor 3 has an outer peripheral surface that expands in accordance with the enlargement of the inner diameter of the truncated cone of the container body 2, and the outer peripheral surface of the rotor 3 and the inner peripheral surface of the truncated cone of the container body 2 are maintained at a constant interval.

On the outer peripheral surface of the rotor 3, a first concave-convex portion 13 of the rotor in which concave and convex are alternately provided along the surface of the rotor 3 is provided.

The first concave-convex portion 13 of the rotor is inclined to the rotation axis 12 of the rotor 3 in the direction of from the introduction portion 4 to the discharge portion 8, and has a feeding ability in the direction of from the introduction portion 4 to the discharge portion 8. That is, the first concave-convex portion 13 of the rotor is inclined in the direction in which the solution is pushed toward the downstream side when the rotor 3 rotates in the direction shown in FIG. 1.

A step difference between a concave portion 13A and a convex portion 13B of the first concave-convex portion 13 of the rotor is preferably 0.3 to 30, more preferably 0.5 to 15, and still more preferably 2 to 7, when the diameter of the concave portion 13A on the outer peripheral surface of the rotor 3 is 100.

The number of convex portions 13B of the first concave-convex portion 13 of the rotor in the circumferential direction is preferably 2 to 1000, more preferably 6 to 500, and still more preferably 12 to 200.

A ratio of the width of the convex portion 13B to the width of the concave portion 13A of the first concave-convex portion 13 of the rotor [(width of the convex portion)/(width of the concave portion)] in the cross section orthogonal to the rotation axis 12 of the rotor 3 is preferably 0.01 to 100, more preferably 0.1 to 10, and still more preferably 0.5 to 2.

An inclination angle of the first concave-convex portion 13 of the rotor with respect to the rotation axis 12 is preferably 2 to 85°, more preferably 3 to 45°, and still more preferably 5 to 20°.

It is preferred that the first inner peripheral surface 6 of the container body 2 is provided with the first concave-convex portion 9 formed with a plurality of concave and convex along the inner peripheral surface thereof.

It is preferred that the concave and convex of the first concave-convex portion 9 on the side of the container body 2 are inclined in the opposite direction to the first concave-convex portion 13 of the rotor.

That is, it is preferred that the plurality of concave and convex of the first concave-convex portion 9 on the side of the container body 2 be inclined in the direction in which the solution is pushed toward the downstream side when the rotation axis 12 of the rotor 3 rotates in the direction shown in FIG. 1. The stirring ability and the discharge ability are further enhanced by the first concave-convex portion 9 having a plurality of concave and convex provided on the first inner peripheral surface 6 of the container body 2.

A depth of the concave and convex of the first concave-convex portion 9 on the side of the container body 2 is preferably 0.2 to 30, more preferably 0.5 to 15, and still more preferably 1 to 5, when the inner diameter (diameter) of the container is set to 100.

The number of concave and convex of the first concave-convex portion 9 on the side of the container body 2 is preferably 2 to 1,000, more preferably 6 to 500, and still more preferably 12 to 200.

A ratio of the width of the concave portion to the width of the convex portion between grooves in the concave and convex of the first concave-convex portion 9 on the side of the container body 2 [(width of the concave portion)/(width of the convex portion)] is preferably 0.01 to 100, more preferably 0.1 to 10, and still more preferably 0.5 to 2 or less.

An inclination angle of the concave and convex of the first concave-convex portion 9 on the side of the container body 2 to the rotation axis 12 is preferably 2 to 85°, more preferably 3 to 45°, and still more preferably 5 to 20°.

By providing the first concave-convex portion 9 on the first inner peripheral surface 6 of the container body 2, the first inner peripheral surface 6 can be made to function as a shearing portion for imparting a high shearing force to the grease raw material or grease, but the first concave-convex portion 9 does not necessarily have to be provided.

It is preferred that a second concave-convex portion 14 of a rotor having concave and convex alternately provided along the surface of the rotor 3 is provided on the outer peripheral surface of the downstream portion of the first concave-convex portion 13 of the rotor.

The second concave-convex portion 14 of the rotor is inclined to the rotation axis 12 of the rotor 3, and has a feeding suppression ability to push the solution back toward the upstream side from the introduction portion 4 toward the discharge portion 8.

A step difference of the second concave-convex portion 14 of the rotor is preferably 0.3 to 30, more preferably 0.5 to 15, and still more preferably 2 to 7, when the diameter of the concave portion of the outer peripheral surface of the rotor 3 is set to 100.

The number of convex portions of the second concave-convex portion 14 of the rotor in the circumferential direction is preferably 2 to 1000, more preferably 6 to 500, and still more preferably 12 to 200.

A ratio of the width of the convex portion to the width of the concave portion of the second concave-convex portion 14 of the rotor in a cross section orthogonal to the rotation axis of the rotor 3 [(width of the convex portion)/(width of the concave portion)] is preferably 0.01 to 100, more preferably 0.1 to 10, and still more preferably 0.5 to 2.

An inclination angle of the second concave-convex portion 14 of the rotor to the rotation axis 12 is preferably 2 to 85°, more preferably 3 to 45°, and still more preferably 5 to 20°.

It is preferred that the second inner peripheral surface 7 of the container body 2 is provided with the second concave-convex portion 10 formed with a plurality of concave and convex adjacent to the downstream portion of the concave and convex in the first concave-convex portion 9 on the side of the container body 2.

It is preferred that the plurality of concave and convex are formed on the inner peripheral surface of the container body 2, and that the concave and convex are inclined in opposite directions to the inclination direction of the second concave-convex portion 14 of the rotor.

That is, it is preferred that the plurality of concave and convex of the second concave-convex portion 10 on the side of the container body 2 are inclined in the direction in which the solution is pushed back toward the upstream side when the rotation axis 12 of the rotor 3 rotates in the direction shown in FIG. 1. A stirring ability is more enhanced by the concave and convex of the second concave-convex portion 10 provided on the second inner peripheral surface 7 of the container body 2. In addition, the second inner peripheral surface 7 of the container body can function as a shearing portion which imparts a high shearing force to the grease raw material or grease.

A depth of the concave portion of the second concave-convex portion 10 on the side of the container body 2 is preferably 0.2 to 30, more preferably 0.5 to 15, and still more preferably 1 to 5, when the inner diameter (diameter) of the container body 2 is set to 100.

The number of concave portions of the second concave-convex portion 10 on the side of the container body 2 is preferably 2 to 1,000, more preferably 6 to 500, and still more preferably 12 to 200.

A ratio of the width of the convex portion of the concave and convex of the second concave-convex portion 10 on the side of the container body 2 to the width of the concave portion in the cross section orthogonal to the rotation axis 12 of the rotor 3 [(width of the convex portion)/(width of the concave portion)] is preferably 0.01 to 100, more preferably 0.1 to 10, and still more preferably 0.5 to 2 or less.

An inclination angle of the second concave-convex portion 10 on the side of the container body 2 to the rotation axis 12 is preferably 2 to 85°, more preferably 3 to 45°, and still more preferably 5 to 20°.

A ratio of the length of the first concave-convex portion 9 on the side of the container body 2 to the length of the second concave-convex portion 10 on the side of the container body 2 [(length of the first concave-convex portion)/(length of the second concave-convex portion)] is preferably 2/1 to 20/1.

Figure 2:
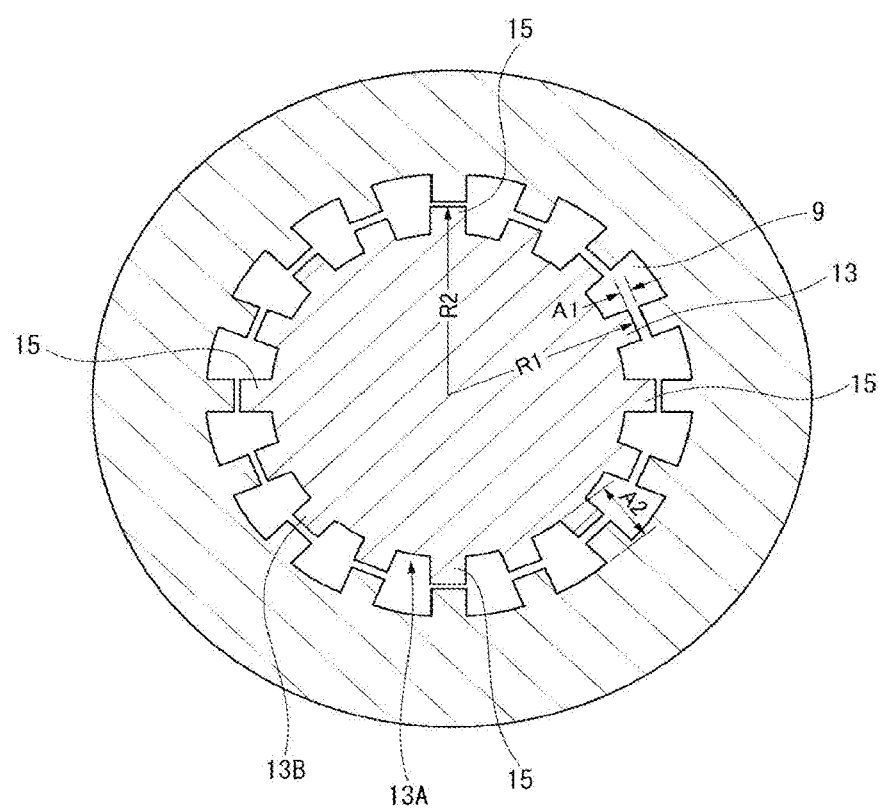
FIG. 2 is a schematic cross-sectional view of the direction orthogonal to a rotation axis in a first concave-convex portion on the side of a container body of the grease manufacturing apparatus of FIG. 1.

FIG. 2 is a cross-sectional view of the direction orthogonal to the rotation axis 12 in the first concave-convex portion 9 on the side of the container body 2 of the grease manufacturing apparatus 1.

In the first concave-convex portion 13 of the rotor shown in FIG. 2, a plurality of scrapers 15 each having a tip protruding toward the inner peripheral surface side of the container body 2 beyond the tip in the projecting direction of the convex portion 13B of the first concave-convex portion 13 are provided. In addition, though not shown, the second concave-convex portion 14 is also provided with a plurality of scrapers in which the tip of the convex portion protrudes toward the inner peripheral surface side of the container body 2, similarly to the first concave-convex portion 13.

The scraper 15 scrapes off the grease adhered to the inner peripheral surface of the first concave-convex portion 9 on the side of the container body 2 and the second concave-convex portion 10 on the side of the container body 2.

With respect to the protrusion amount of the tip of the scraper 15 relative to the projecting amount of the convex portion 13B of the first concave-convex portion 13 of the rotor, a ratio [R2/R1] of the radius (R2) of the tip of the scraper 15 to the radius (R1) of the tip of the convex portion 13B is preferably more than 1.005 and less than 2.0.

The number of scrapers 15 is preferably 2 to 500, more preferably 2 to 50, and still more preferably 2 to 10.

In the grease manufacturing apparatus 1 shown in FIG. 2, the scraper 15 is provided, but may not be provided, or may be provided intermittently.

In order to produce the grease containing the urea-based thickener (B) by the grease manufacturing apparatus 1, the solution α and the solution ß which are the aforementioned grease raw materials are introduced respectively from the solution introducing pipes 4A and 4B of the introduction portion 4 of the container body 2, and the rotor 3 is rotated at a high speed, whereby the grease base material containing the urea-based thickener can be produced.

Even if the additive (C) is added to the grease base material thus obtained, the urea-based thickener in the grease composition can be micronized so as to satisfy the requirement (I) and further the requirement (II).

As a high-speed rotation condition of the rotor 3, a shear rate applied to the grease raw material is preferably $10^2$ $s^{-1}$ or more, more preferably $10^3$ $s^{-1}$ or more, and still more preferably $10^4$ $s^{-1}$ or more, and it is typically $10^7$ $s^{-1}$ or less.

A ratio of a maximum shear rate (Max) to a minimum shear rate (Min) in the shearing at the time of high-speed rotation of the rotor 3 (Max/Min) is preferably 100 or less, more preferably 50 or less, and still more preferably 10 or less.

When the shear rate with respect to the mixed solution is as uniform as possible, the urea-based thickener or the precursor thereof in the grease composition is easily micronized, and a more uniform grease structure is obtained.

Here, the maximum shear rate (Max) is a highest shear rate applied to the mixed solution, and the minimum shear rate (Min) is a lowest shear rate applied to the mixed solution, which are defined as follows.

Maximum shear rate (Max)=(linear velocity at the tip of the convex portion 13B of the first concave-convex portion 13 of the rotor)/(gap A1 between the tip of the convex portion 13B of the first concave-convex portion 13 of the rotor and the convex portion of the first concave-convex portion 9 of the first inner peripheral surface 6 of the container body 2)

Minimum shear rate (Min)=(linear velocity of the concave portion 13A of the first concave-convex portion 13 of the rotor)/(gap A2 between the concave portion 13A of the first concave-convex portion 13 of the rotor and the concave portion of the first concave-convex portion 9 on the first inner peripheral surface 6 of the container body 2)

The gap A1 and the gap A2 are as shown in FIG. 2.

The grease manufacturing apparatus 1 is provided with the scraper 15, thereby grease adhered to the inner peripheral surface of the container body 2 can be scraped off, so that the generation of the lumps during kneading can be prevented, and the grease in which the urea-based thickener is micronized can be continuously produced in a short time.

In addition, in view of the fact that the scraper 15 scrapes off the grease adhered thereto, it is possible to prevent the retained grease from becoming a resistance to rotation of the rotor 3, so that the rotational torque of the rotor 3 can be reduced, and the power consumption of the drive source can be reduced, thereby making it possible to continuously produce the grease efficiently.

Since the inner peripheral surface of the container body 2 is in a shape of a truncated cone whose inner diameter increases from the introduction portion 4 toward the discharge portion 8, the centrifugal force has an effect for discharging the grease or grease raw material in the downstream direction, and the rotation torque of the rotor 3 can be reduced to continuously produce the grease.

Since the first concave-convex portion 13 of the rotor is provided on an outer peripheral surface of the rotor 3, the first concave-convex portion 13 of the rotor is inclined to the rotation axis 12 of the rotor 3, the first concave-convex portion 13 has a feeding ability from the introduction portion 4 to the discharge portion 8, the second concave-convex portion 14 of the rotor is inclined to the rotation axis 12 of the rotor 3, and the second concave-convex portion 14 has a feeding suppression ability from the introduction portion 4 to the discharge portion 8, a high shear force can be given to the solution, and the urea-based thickener (B) can be micronized in the grease composition so as to satisfy the requirement (I) and further the requirement (II) even after blending the additive.

Since the first concave-convex portion 9 is formed on the first inner peripheral surface 6 of the container body 2 and is inclined in the opposite direction to the first concave-convex portion 13 of the rotor, in addition to the effect of the first concave-convex portion 13 of the rotor, sufficient stirring of grease raw material can be carried out while extruding the grease or grease raw material in the downstream direction, and the urea-based thickener (B) of the grease composition can be micronized so as to satisfy the requirement (I) and further the requirement (II) even after blending the additive.

In addition, the second concave-convex portion 10 is provided on the second inner peripheral surface 7 of the container body 2, and the second concave-convex portion 14 of the rotor is provided on the outer peripheral surface of the rotor 3, thereby the grease raw material can be prevented from flowing out from the first inner peripheral surface 6 of the container body more than necessary, so that the urea-based thickener (B) can be micronized so as to satisfy the requirement (I) and further the requirement (II) even after blending the additive by giving a high shear force to the solution to highly disperse the grease raw material.

<Additive (C)>

The grease composition of one embodiment of the present invention may contain an additive (C) other than the component (B), which is blended in a general grease, within a range in which the effects of the present invention are not impaired.

Examples of the additive (C) include an antioxidant, a rust inhibitor, a dispersant, an extreme pressure agent, and a metal deactivator.

The additive (C) may be used alone or may be used in combination of two or more thereof.

Examples of the antioxidant include an amine-based antioxidant such as a diphenylamine-based compound and a naphthylamine-based compound, and a phenol-based antioxidant such as a monocyclic phenol-based compound and a polycyclic phenol-based compound.

Examples of the rust inhibitor include a carboxylic acid rust inhibitor such as an alkenyl succinic acid polyhydric alcohol ester, zinc stearate, thiadiazole and a derivative thereof, and benzotriazole and a derivative thereof.

Examples of the dispersant include an ashless dispersant such as succinimide and boron-based succinimide.

Examples of the extreme pressure agent include a zinc dialkyl dithiophosphate, a molybdenum dialkyl dithiophosphate, a thiocarbamic acid, such as an ash-free dithiocarbamate, zinc dithiocarbamate, and molybdenum dithiocarbamate; a sulfur compound, such as sulfurized fats and oils, a sulfidized olefin, a polysulfide, a thiophosphoric acid, a thioterpene, and a dialkyl thiodipropionate; a phosphoric acid ester, such as tricresyl phosphate; and a phosphorous acid ester, such as triphenyl phosphite.

Examples of the metal deactivator include a benzotriazole-based compound.

In the grease composition of one embodiment of the present invention, the content of the additive (C) is usually 0.01 to 20% by mass, preferably 0.01 to 15% by mass, more preferably 0.01 to 10% by mass, and still more preferably 0.01 to 7% by mass, based on the whole amount (100% by mass) of the grease composition.

<Method of Blending Additives>

The grease composition of the present invention can be produced by mixing the grease containing the base oil (A) and the urea-based thickener (B) synthesized by the above-described method with various additives such as the additive (C). For example, the grease composition can be produced by blending various additives such as the additive (C) and then stirring the blend, or by blending various additives such as the additive (C) while stirring the grease.

<Physical Properties of Grease Composition of the Present Invention>

(Worked Penetration at 25° C.)

The worked penetration at 25° C. of the grease composition of one embodiment of the present invention is preferably 180 to 350, more preferably 200 to 320, still more preferably 220 to 310, and even still more preferably 220 to 280.

In the description herein, the worked penetration of the grease composition means a value measured at 25° C. in conformity with ASTM D 217 method.

(Dropping Point)

The dropping point of the grease composition of one embodiment of the present invention is preferably 240° C. or higher, more preferably 250° C. or higher, still more preferably 255° C. or higher, and even still more preferably 260° C. or higher.

In the description herein, the dropping point of the grease composition means a value measured at 25° C. in conformity with JIS K2220 8:2013.

(Bearing Life in Conformity with ASTM D 3336)

The bearing life (DN value: 200,000) in conformity with ASTM D 3336 of the grease composition of one embodiment of the present invention is preferably 1200 hours or more, more preferably 1500 hours or more, still more preferably 1800 hours or more, and even still more preferably 2000 hours or more.

The bearing life test conditions in conformity with ASTM D 3336 are the same as in Examples described later.

<Application of Grease Composition of the Present Invention>

The grease composition of the present invention can impart excellent durability to a bearing used under a high-speed rotation condition with a DN value of 100,000 or more.

Accordingly, the grease composition of one embodiment of the present invention can be used for a lubrication application for a bearing used under a high-speed rotation condition with a DN value of 100,000 or more, preferably for a bearing used under a high-speed rotation condition with a DN value of 200,000 or more, more preferably for a bearing used under a high-speed rotation condition with a DN value of 300,000 or more, still more preferably for a bearing used under a high-speed rotation condition with a DN value of 500,000 or more, and even still more preferably for a bearing used under a high-speed rotation condition with a DN value of 1,000,000 or more. Specifically, the lubricating oil composition can be used for a lubrication application of a bearing of a drive motor used in an electric vehicle, a hybrid vehicle, and a plug-in hybrid vehicle or a bearing of a spindle motor of a machine tool.

Accordingly, one embodiment of the present invention provides a bearing lubricated with the grease composition of the present invention and used under a high-speed rotation condition with a DN value of 100,000 or more (preferably a bearing used under a high-speed rotation condition with a DN value of 200,000 or more, more preferably a bearing used under a high-speed rotation condition with a DN value of 300,000 or more, still more preferably a bearing used under a high-speed rotation condition with a DN value of 500,000 or more, and even still more preferably a bearing used under a high-speed rotation condition with a DN value of 1,000,000 or more).

In addition, one embodiment of the present invention provides a lubricating method including lubricating a bearing used under a high-speed rotation condition with a DN value of 100,000 or more (preferably a bearing used under a high-speed rotation condition with a DN value of 200,000 or more, more preferably a bearing used under a high-speed rotation condition with a DN value of 300,000 or more, still more preferably a bearing used under a high-speed rotation condition with a DN value of 500,000 or more, and even still more preferably a bearing used under a high-speed rotation condition with a DN value of 1,000,000 or more) by the grease composition of the present invention.

EXAMPLES

The present invention will be described in more detail with reference to the following Examples, but the present invention is not limited to the following Examples.

[Various Physical Property Values]

Various physical property values were measured as follows.

(1) Kinematic Viscosity at 40° C., Kinematic Viscosity at 100° C., and Viscosity Index The measurement and calculation were performed in conformity with JIS K2283:2000.

(2) Worked Penetration

The measurement was performed at 25° C. in conformity with ASTM D 217 method.

(3) Dropping Point

The measurement was performed in conformity with JIS K2220 8:2013.

Example 1

(1) Synthesis of Urea Grease

To 92.04 parts by mass of a poly-α-olefin (PAO) as a base oil (kinematic viscosity at 40° C.: 47 mm$^2$/s, kinematic viscosity at 100° C.: 7.8 mm$^2$/s, viscosity index: 137) which had been heated at 70° C., 7.96 parts by mass of diphenylmethane-4,4'-diisocyanate (MDI) was added to prepare a solution α.

In addition, to 87.94 parts by mass of a separately prepared poly-α-olefin (PAO) (kinematic viscosity at 40° C.: 47 mm$^2$/s, kinematic viscosity at 100° C.: 7.8 mm$^2$/s, viscosity index: 137) which had been heated at 70° C., 2.01 parts by mass of cyclohexylamine and 10.05 parts by mass of stearylamine were added to prepare a solution ß. The molar ratio of stearylamine to cyclohexylamine (stearylamine/cyclohexylamine) is 65/35.

Then, using the grease manufacturing apparatus 1 shown in FIG. 1, the solution α which had been heated at 70° C. was introduced at a flow rate of 150 L/h from the solution introducing pipe 4A into the container body 2, and the solution ß which had been heated at 70° C. was simultaneously introduced at a flow rate of 150 L/h from the solution introducing pipe 4B into the container body 2, and the solution α and the solution ß were unintermittently continuously introduced into the container body 2 in a state of rotating the rotor 3. The rotation number of the rotator 3 of the grease manufacturing apparatus 1 used was 8,000 rpm.

In addition, on this occasion, a maximum shear rate (Max) was 10,500 s$^{-1}$, and stirring was performed by setting a ratio of a maximum shear rate (Max) to a minimum shear rate (Min) [Max/Min] to 3.5.

The urea-based thickener contained in the obtained urea grease is corresponding to a compound represented by the general formula (hi) wherein R$^1$ and R$^2$ are selected from a cyclohexyl group and a stearyl group (octadecyl group), and R$^3$ is a diphenylmethylene group.

(2) Preparation of Grease Composition

The urea grease obtained in (1) above (discharged from the grease manufacturing apparatus 1 shown in FIG. 1) was stirred and then cooled by natural cooling, and 4,4-dinonyldiphenylamine as an antioxidant and an alkenyl succinic acid polyhydric alcohol ester as a rust inhibitor were added as an additive (C) to obtain a grease composition (i).

The content of each component in the grease composition (i) is as shown in Table 1 and Table 2.

Example 2

A grease composition (ii) was obtained in the same manner as in Example 1 except that the base oil for preparing the solution α and the solution ß was changed from PAO to a mineral oil (kinematic viscosity at 40° C.: 138.0 mm$^2$/s, kinematic viscosity at 100° C.: 14.5 mm$^2$/s, viscosity index: 104).

The content of each component in the grease composition (ii) is as shown in Table 1.

Comparative Example 1

(1) Synthesis of Urea Grease

The same solution α and solution ß prepared in Example 1 were used.

Figure 3:
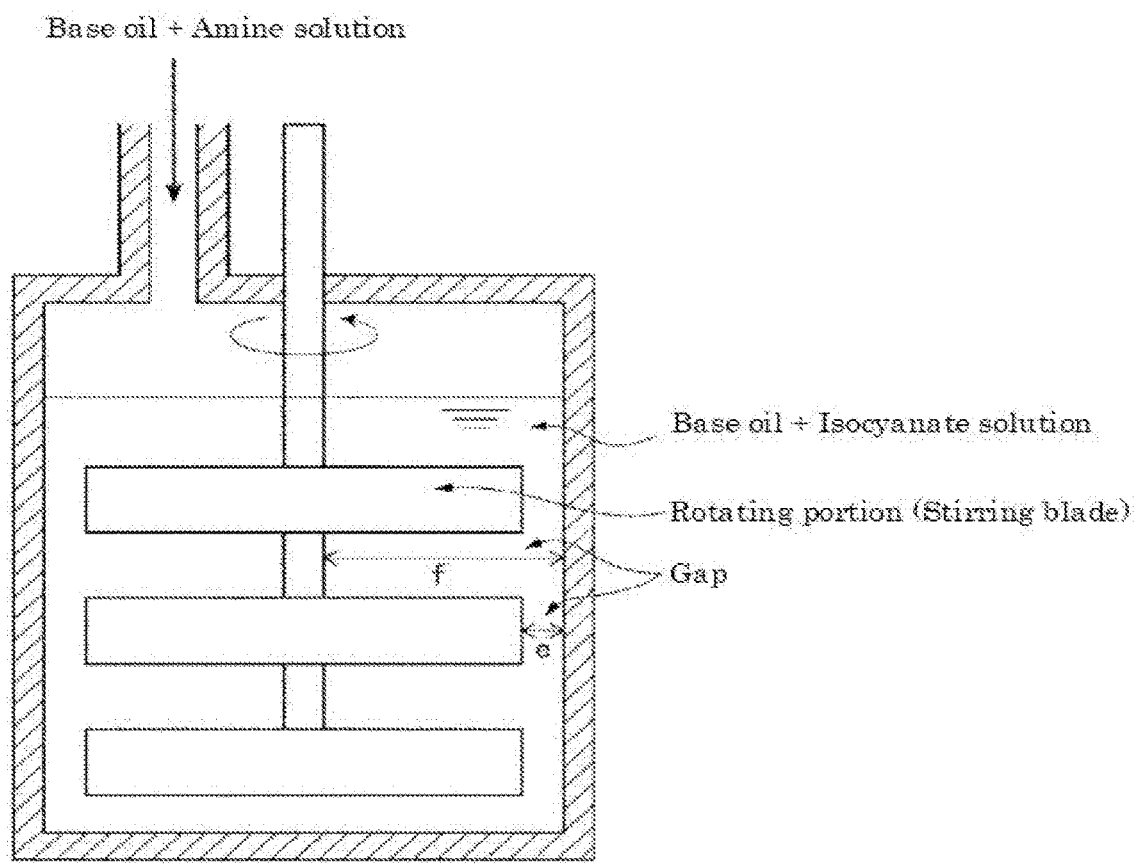
FIG. 3 is a schematic cross-sectional view of a grease manufacturing apparatus used in Comparative Example.

Using the grease manufacturing apparatus shown in FIG. 3, the solution α which had been heated at 70° C. was introduced at a flow rate of 504 L/h from the solution introducing pipe into the container body. Then, the solution ß which had been heated at 70° C. was introduced at a flow rate of 144 L/h from the solution introducing pipe into the container body containing the solution α. After all of the solution ß was introduced into the container body, the temperature was increased to 160° C. while the stirring blade was rotated and stirring was continued, and the temperature was maintained for 1 hour to synthesize a urea grease.

In addition, on this occasion, a maximum shear rate (Max) was 42,000 s$^{-1}$, and stirring was performed by setting a ratio of a maximum shear rate (Max) to a minimum shear rate (Min) [Max/Min] to 1.03.

(2) Preparation of Grease Composition

The urea grease obtained in (1) above (discharged from the grease manufacturing apparatus shown in FIG. 3) was stirred and then cooled by natural cooling, and 4,4-dinonyldiphenylamine as an antioxidant and an alkenyl succinic acid polyhydric alcohol ester as a rust inhibitor were added as an additive (C) to obtain a grease composition (iii).

The content of each component in the grease composition (iii) is as shown in Table 1 and Table 2.

Comparative Example 2

A grease composition (iv) was obtained in the same manner as in Comparative Example 1 except that the base oil for preparing the solution α and the solution ß was changed from PAO to a mineral oil (kinematic viscosity at 40° C.: 138.0 mm$^2$/s, kinematic viscosity at 100° C.: 14.5 mm$^2$/s, viscosity index: 104).

The content of each component in the grease composition (iv) is as shown in Table 1.

[Evaluation]

For the grease compositions (i) to (iv) prepared in Examples 1 and 2 and Comparative Examples 1 and 2, worked penetration and dropping point were measured, and the following measurements were performed.

<Particle Diameter of Particles Containing Urea-Based Thickener (B) in Grease Composition: Requirement (I)>

The prepared grease compositions (i) to (iv) were subjected to vacuum defoaming and then filled in a 1-mL syringe, 0.10 to 0.15 mL of the grease compositions were extruded from the syringe, and each of the extruded grease compositions was placed on a surface of a platy cell of a fixture for paste cell.

Then, another platy cell was superimposed on the grease composition, thereby obtaining a measuring cell having the grease composition sandwiched by two sheets of the cells.

The arithmetic mean particle diameter on an area basis of the particles (particles containing the urea-based thickener (B)) in the grease composition of the measuring cell was measured using a laser diffraction particle size analyzer (trade name: LA-920, manufactured by Horiba, Ltd.). Since the 4,4-dinonyldiphenylamine and the alkenyl succinic acid polyhydric alcohol ester used as the additive (C) are both liquid at room temperature (25° C.), they do not affect the measurement of the particles (particles containing the urea-based thickener (B)) in the grease composition.

Here, the "arithmetic mean particle diameter on an area basis" means a value obtained by arithmetically averaging a particle size distribution on an area basis.

Figure 4:
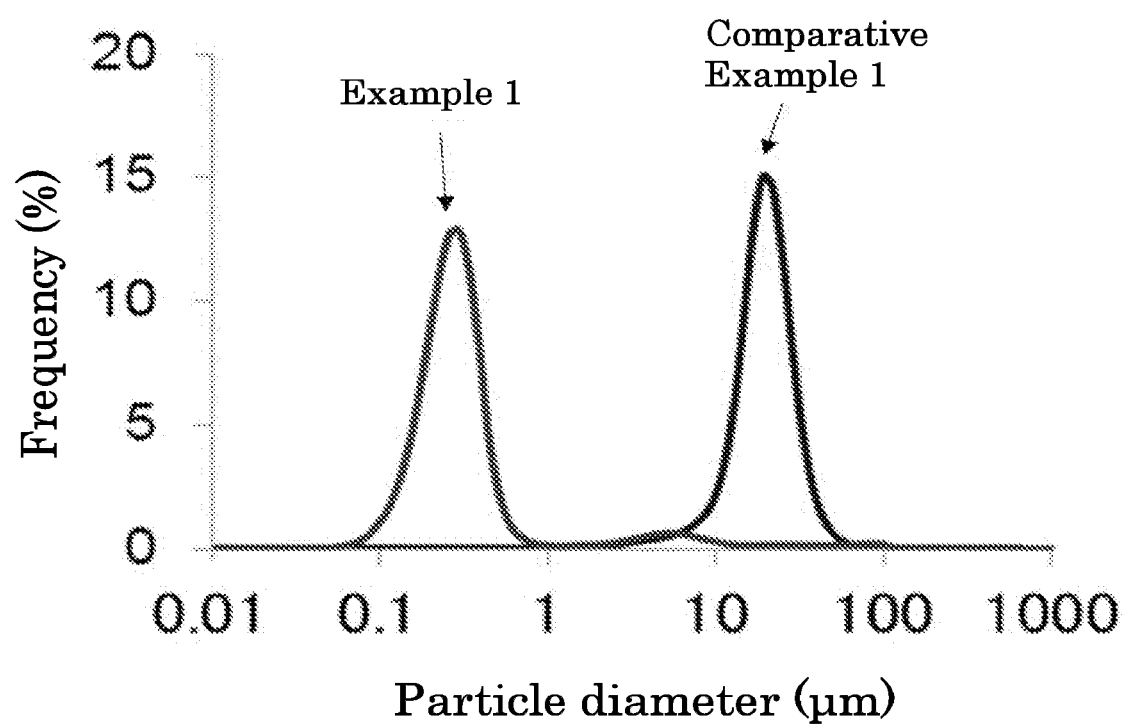
FIG. 4 is a particle size distribution curve on an area basis when particles containing a urea-based thickener in the grease compositions produced in Example 1 and Comparative Example 1 are measured by a laser diffraction scattering method.

The particle size distribution on an area basis is shown in FIG. 4. The particle size distribution on an area basis shows a frequency distribution of the particle diameter in the entire particle to be measured on the basis of the area calculated from the particle diameter (specifically, the cross-sectional area of the particle having the particle diameter).

Further, the value obtained by arithmetically averaging the particle size distribution on the area basis can be calculated by the following formula (1).

$$\text{Arithmetic mean particle diameter} = \Sigma\{q(J) \times X(J)\} \div \Sigma\{q(J)\} \quad (1)$$

In the above formula (1), J means a division number of a particle diameter. q (J) means a frequency distribution value (unit: %). X (J) is a representative diameter (unit: μm) of a J-th particle diameter range.

The particle size distribution of the grease composition (i) prepared in Example 1 and the grease composition (iii) prepared in Comparative Example 1 on an area basis, measured using a laser diffraction particle size analyzer, is shown in FIG. 4. As is clear from the particle size distribution curve shown in FIG. 4, the particles containing the urea-based thickener (B) in the grease composition (i) prepared in Example 1 are clearly micronized compared with the particles containing the urea-based thickener (B) in the grease composition (iii) prepared in Comparative Example 1.

<Specific Surface Area of Particles Containing Urea-Based Thickener (B) in Grease Composition: Requirement (II)>

The specific surface area of the prepared grease compositions (i) and (iii) was calculated using the particle size distribution of the particles containing the urea-based thickener (B) in the grease composition measured in the column of <Particle Diameter of Particles Containing Urea-based Thickener (B) in Grease Composition: Requirement (I)> above. To be specific, the total surface area (unit: cm²) of the particles per unit volume (1 cm³) was calculated using the particle size distribution, and this was defined as the specific surface area (unit: cm²/cm³).

<Evaluation of Bearing Life of Grease Composition>

(1) Evaluation of Bearing Life in Conformity with ASTM D 1741

The bearing life of the prepared grease compositions (i) to (iv) was evaluated using a bearing lubrication life tester in conformity with ASTM D 1741.

The test conditions are shown below.

Test bearing: 6306
Rotational speed: 3,500 rpm
Test load: Radial load 2.5 Lbs, Thrust load 40 Lbs
Test temperature: 150° C.
DN value: 90,000
Grease amount: 20 g The time required for the motor to generate an overcurrent (4 amperes or more) or the time required for the bearing outer ring temperature to rise by 15° C. above the test temperature, whichever is shorter, was defined as the seizure life, and this was evaluated as the bearing life.

(2) Evaluation of Bearing Life in Conformity with ASTM D 3336

The bearing life of the prepared grease compositions (i) to (iv) was evaluated using a bearing lubrication life tester in conformity with ASTM D 3336.

The test conditions are shown below.

Test bearing: 6204
Rotational speed: 10,000 rpm
Test load: Radial load 15 Lbs, Thrust load 15 Lbs
Test temperature: 160° C.
DN value: 200,000
Grease amount: 20 g The time required for the motor to generate an overcurrent (4 amperes or more) or the time required for the bearing outer ring temperature to rise by 15° C. above the test temperature, whichever is shorter, was defined as the seizure life, and this was evaluated as the bearing life.

The evaluation results other than the specific surface area are shown in Table 1, and the evaluation results of the specific surface area are shown in Table 2.

TABLE 1

|  |  |  |  | Example 1 | Example 2 | Comparative Example 1 | Comparative Example 2 |
|---|---|---|---|---|---|---|---|
| Composition of grease composition | Grease composition |  |  | (i) | (ii) | (iii) | (iv) |
|  | Base oil (A) | PAO | mass % | 87.30 | — | 87.30 | — |
|  |  | Mineral oil | mass % | — | 85.30 | — | 85.30 |
|  | Urea-based thickener (B) |  | mass % | 9.70 | 9.70 | 9.70 | 9.70 |
|  | Additive (C) |  | mass % | 3.00 | 5.00 | 3.00 | 5.00 |
|  | Total |  | mass % | 100 | 100 | 100 | 100 |
| Measurement results of particles containing urea-based thickener (B) | Requirement (I) | Arithmetic mean particle diameter | μm | 0.6 | 0.6 | 90 | 90 |
| Evaluation of various physical properties | Worked penetration (25° C.) |  | — | 272 | 291 | 265 | 280 |
|  | Dropping point |  | ° C. | 260 or more | 260 or more | 260 or more | 260 or more |
|  | Bearing life in conformity with ASTM D 1741 (DN value: 90,000) |  | hour | 825 | 601 | 818 | 541 |
|  | Bearing life in conformity with ASTM D 3336 (DN value: 200,000) |  | hour | 2256 | 2068 | 1181 | 1341 |

Additive (C): antioxidant (4,4-dinonyldiphenylamine), rust inhibitor (alkenyl succinic acid polyhydric alcohol ester)

TABLE 2

|  |  |  |  | Example 1 | Comparative Example 1 |
|---|---|---|---|---|---|
| Composition of grease composition | Grease composition |  |  | (i) | (iii) |
|  | Base oil (A) | PAO | mass % | 87.80 | 87.30 |
|  |  | Mineral oil | mass % | — | — |
|  | Urea-based thickener (B) |  | mass % | 9.70 | 9.70 |
|  | Additive (C) |  | mass % | 3.00 | 3.00 |
|  | Total |  | mass % | 100 | 100 |
| Measurement results of particles containing urea-based thickener (B) | Requirement (II) | Specific surface area | cm²/cm³ | 217000 | 16700 |

Additive (C): antioxidant (4,4-dinonyldiphenylamine), rust inhibitor (alkenyl succinic acid polyhydric alcohol ester)

In the evaluation of the bearing life in conformity with ASTM D 1741 (DN value: 90,000), there was almost no difference in the bearing life between Examples 1 and 2 and Comparative Examples 1 and 2.

In contrast, in the evaluation of the bearing life in conformity with ASTM D 3336 (DN value: 200,000), a significant difference in the bearing life appeared between Examples 1 and 2 and Comparative Examples 1 and 2, and it was found that the bearing life was significantly increased in Examples 1 and 2.

In Examples 1 and 2, the particles containing the urea-based thickener (B) in the grease composition satisfy the requirement (I). In Example 1, the particles containing the urea-based thickener (B) in the grease composition also satisfy the requirement (II). In contrast, in Comparative Examples 1 and 2, the particles containing the urea-based thickener (B) in the grease composition do not satisfy the requirement (I). In Comparative Example 1, the particles containing the urea-based thickener (B) in the grease composition also do not satisfy the requirement (II).

Therefore, it can be seen that when the particles containing the urea-based thickener (B) in the grease composition satisfy the above-described requirement (I) and further satisfy the above-described requirement (II), the effect of significantly longer bearing life is achieved.

REFERENCE SIGNS LIST

1 Grease manufacturing apparatus
2 Container body
3 Rotor
4 Introduction portion
4A, 4B Solution introducing pipe
5 Retention portion
6 First concave-convex portion
7 Second concave-convex portion
8 Discharge portion
9: First concave-convex portion on the side of container body
10: Second concave-convex portion on the side of container body
11 Discharge port
12 Rotation axis
13 First concave-convex portion of rotor
13A Concave portion
13B Convex portion
14 Second concave-convex portion of rotor
15 Scraper
A1, A2 Gap

The invention claimed is:

1. A lubricating method, comprising:
lubricating a bearing used under a high-speed rotation condition with a DN value of 100,000 or more by a grease composition that comprises:
a base oil (A), and
a urea-based thickener (B),
wherein particles containing the urea-based thickener (B) in the grease composition have an arithmetic mean particle diameter of 2.0 μm or less on an area basis when measured by a laser diffraction scattering method.

2. The lubricating method according to claim 1, wherein:
the urea-based thickener (B) comprises a diurea compound of formula (b1):

$$R^1\text{---NHCONH---}R^3\text{---NHCONH---}R^2 \quad (b1)$$

wherein $R^1$ and $R^2$ each independently represent a monovalent hydrocarbon group having 6 to 24 carbon atoms, $R^1$ and $R^2$ are different from each other, at least one of $R^1$ and $R^2$ represents a monovalent hydrocarbon group having 10 to 24 carbon atoms, and $R^3$ represents a divalent aromatic hydrocarbon group having 6 to 18 carbon atoms.

3. The lubricating method according to claim 1, wherein the particles containing the urea-based thickener (B) have a specific surface area of 20,000 cm²/cm³ or more, as measured by a laser diffraction scattering method.

4. The lubricating method according to claim 1, wherein the base oil (A) is one or more selected from the group consisting of a mineral oil, a hydrocarbon-based oil, an aromatic-based oil, an ester-based oil, and an ether-based oil.

5. The lubricating method according to claim 1, wherein the base oil (A) has a kinematic viscosity at 40° C. of 10 to 300 mm²/s.

6. The lubricating method according to claim 1, wherein the urea-based thickener (B) has an amount of from 1 to 40% by mass based on a whole amount of the grease composition.

7. The lubricating method according to claim 1, wherein the grease composition further comprises at least one additive (C) selected from the group consisting of an antioxidant, a rust inhibitor, a dispersant, an extreme pressure agent, and a metal deactivator.

8. The lubricating method according to claim 7, wherein the at least one additive (C) has an amount of from 0.01 to 20% by mass based on a whole amount of the grease composition.

9. The lubricating method according to claim 1, wherein the lubricating the bearing comprises lubricating a bearing of a drive motor for an electric vehicle, a hybrid vehicle, and a plug-in hybrid vehicle.

10. A bearing lubricated by the lubricating method according to claim 1 and used under the high-speed rotation condition with a DN value of 100,000 or more.

11. The lubricating method according to claim 1, wherein the urea-based thickener (B) comprises a diurea compound represented by formula (b1):

$$R^1\text{---NHCONH---}R^3\text{---NHCONH---}R^2 \quad (b1)$$

wherein $R^1$ and $R^2$ each independently represent a monovalent hydrocarbon group having 6 to 24 carbon atoms, $R^1$ and $R^2$ may be the same as or different from each other, and $R^3$ represents a divalent aromatic hydrocarbon group having 6 to 18 carbon atoms.

\* \* \* \* \*